US005560394A

United States Patent [19]

Jorgensen

[11] Patent Number: 5,560,394

[45] Date of Patent: Oct. 1, 1996

[54] SELF CLEANING EXPANDABLE TUBE PLUG

[75] Inventor: Glenn F. Jorgensen, Ridgewood, N.J.

[73] Assignee: JNT Technical Services, Inc., Little Ferry, N.J.

[21] Appl. No.: 452,895

[22] Filed: May 30, 1995

[51] Int. Cl.$^{6}$ .......... F16L 55/10

[52] U.S. Cl. .......... 138/89; 15/104.05; 15/104.02

[58] Field of Search .......... 138/89; 15/104.05, 15/104.02, 104.03, 104.061

[56] References Cited

U.S. PATENT DOCUMENTS

| | | | |
|---|---|---|---|
| 1,122,246 | 12/1914 | Beam | 15/104.05 |
| 1,495,008 | 5/1924 | Feagin | 15/104.05 |
| 2,959,224 | 11/1960 | Ault | 15/104.03 |
| 4,310,029 | 1/1982 | Dudek | 138/89 |
| 4,425,944 | 1/1984 | Heuckelbach et al. | 138/89 |
| 4,696,318 | 9/1987 | Smith | 15/104.061 |
| 4,762,265 | 8/1988 | Baird et al. | 138/89 |
| 5,473,787 | 6/1994 | Echols | 15/104.061 |

*Primary Examiner*—Frankie L. Stinson
*Assistant Examiner*—James F. Hook
*Attorney, Agent, or Firm*—Hill, Steadman & Simpson

[57] ABSTRACT

A self cleaning plug is positionable within a tube having an internal surface with a defined dimension. The plug is formed of a first rigid member, a compressible member, a bolt, a second rigid member and a cleaning device. The first rigid member has a threaded bore and an external dimension less than the defined dimension of the tube internal surface. The compressible member has a through bore large enough to receive a shank of the bolt. The bolt extends axially through the compressible member and into the threaded bore of the first rigid member. The second rigid member is preferably in the form of a thin disk and is carried on the bolt between the compressible member and a head of the bolt, such that rotation of said bolt into said rigid member will result in axial compression and radial expansion of the compressible member. The cleaning device which is in the form of a wheel or disk and may be an abrasive material or a brush, has an external dimension greater than that of the rigid member and at least as great as the defined dimension so that it will engage the internal surface as the plug is being inserted into the tube. The cleaning device is carried on the plug either at a leading edge of the first rigid member or between the first rigid member and the compressible member.

14 Claims, 1 Drawing Sheet

SELF CLEANING EXPANDABLE TUBE PLUG

BACKGROUND OF THE INVENTION

The present invention relates to a tube plug, and more particularly to an expandable tube plug which includes means to clean the tube prior to effecting a fluid tight seal by means of expansion of the plug.

In some applications, such as in a condenser having tubes which carry refrigerant or other fluids, it is useful to provide a plug for the tubes to effectively seal the tubes against fluid loss, which plugs can be removable, rather than to effect a seal such as by crimping or soldering or other means which might require destruction of the tube to remove the effect of the plug.

U.S. Pat. No. 4,310,029 discloses an expandable plug for use in effecting a fluid-tight seal in a tube which includes a compressible (and expandable) sleeve located between a rigid cylindrical member and rigid sleeve. A bolt extends through the two sleeves and is threaded into the cylindrical member to apply compressive force to the compressible sleeve causing the sleeve to expand radially outwardly into fluid-tight sealing relation with the inner wall of the tube and radially inwardly into fluid-tight sealing relation with the bolt shank thereby protecting the bolt threads from contamination and corrosion. An eccentrically mounted disk is provided at the remote end of the cylindrical member to lock this member against rotation during installation of the plug.

While such a device is effective as a tube plug, in the course of using such a device it is necessary to first clean the interior of the tube, such as by brushing or scraping the interior of the tube with an abrasive material. After the tube has been cleaned, the plug can then be inserted and sealed.

SUMMARY OF THE INVENTION

The present invention provides for an improvement to an expandable plug in that a means for cleaning the interior of the tube is provided on the plug device itself, which means will be effective to clean the interior of the tube merely upon insertion of the plug into the tube. For example, an abrasive disk or wire brush wheel can be carried on the tube plug, having a diameter sufficient to engage the interior walls of the tube, so as to effect cleaning of the tube as the plug is inserted into the tube.

In an embodiment of the invention, the cleaning means, in the form of the abrasive disk or brush, can be used to provide sufficient friction against rotation such that the eccentrically mounted disk as used in the device described above is no longer required, thereby reducing the parts, and thus costs associated with presently available tube plugs.

The cleaning means can be mounted on the leading portion of the tube plug, in the position presently occupied the eccentrically mounted disk in the currently available construction, or the cleaning means can be positioned between the leading cylindrical member and the expandable sleeve, so that the cleaning means will precede the expandable sleeve into the tube.

The cleaning means may be in the form of an abrasive pad or brush. Preferably the cleaning disk or wheel has a diameter slightly greater than the tube plug in its relaxed state such that the cleaning disk or wheel will engage the inside walls of the tube, however, means may be provided to allow the cleaning disk or wheel to be pushed into a recess to assure that the plug can be readily inserted into the tube.

DETAILED DESCRIPTION OF THE PREFERRED EMBODIMENTS

Figure 1:
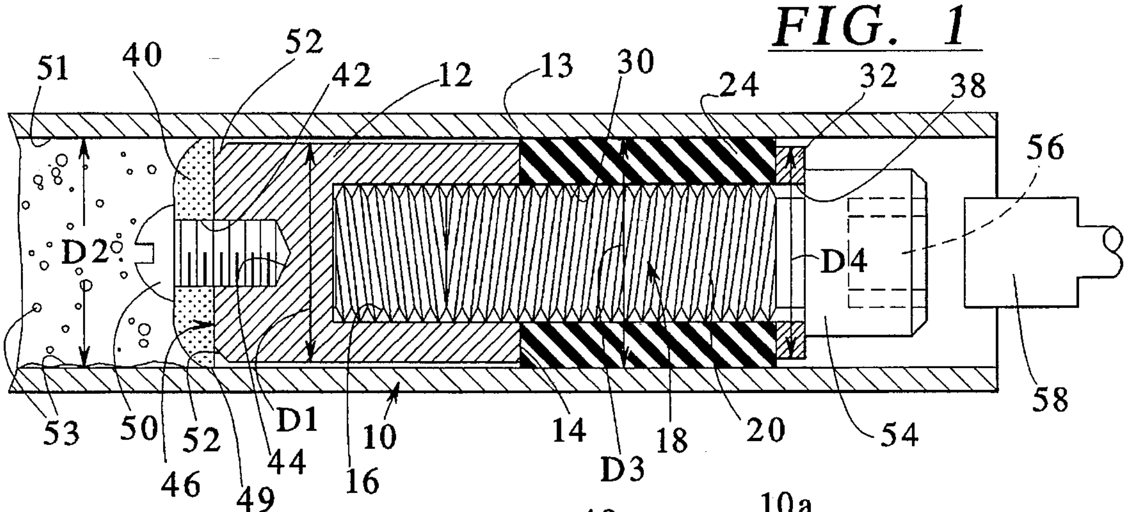
FIG. 1 is a side sectional view of a first embodiment of a tube plug embodying the principles of the present invention inserted in a tube.

A tube plug shown generally at 10 in FIG. 1 which includes a first cylindrical member 12 typically formed of a rigid material such as metal or a hard plastic and having a diameter D1 slightly less than the internal diameter D2 of a tube 13 in which the plug 10 is used. A blind threaded bore 16 extends axially into the member 12 from one end 14 thereof. A bolt 18, preferably formed of a material or coated with a material which can withstand effects of corrosive fluids, if the plug is to be used in such an environment, is threaded into the bore 16. A compressible sleeve 24 and a rigid disk 32 are carried on the shank 20 of the bolt 18. The compressible sleeve 24 (when uncompressed) and the disk 32 each has an external diameter D3, D4, respectively, approximately equal to or greater than the diameter D1 of the cylindrical member 12 and an internal through bore 30, 38, respectively, with a diameter slightly greater than that of the bolt shank 20. The compressible sleeve 24 is preferably formed of an elastomeric material such as rubber or plastic, while the disk 32 is formed of a rigid material such as metal or a hard plastic. The disk 32 can be smaller than the ID in order to fit into the tube or larger than the ID, in order to provide a flange that prevents the plug from being educted into the tube due to a vacuum.

At a remote end 46 of the cylindrical member 12, a second threaded blind bore 44 is provided, this bore being formed along the longitudinal axis of the member 12. A disk 40, which is flexible, having a through hole 42 at the center of the disk is attached to the member 12 by means of a screw 50 threaded into the bore 44. The disk 40 is tightly mounted, being secured against rotation. Preferably, the disk 40 is formed of a material which will provide a significant frictional engagement with the interior surface of the tube 13, for example being formed by an abrasive material such as that sold under the name "3M Scotch Brite Abrasive Disk". An outer diameter D5 of the disk preferably is sized slightly larger than the outer diameter D1 of the cylindrical member 12, such as approximately ¼ of an inch greater, so that an outer periphery 49 of the disk 40 will engage against an interior wall or surface 51 of the tube 13 to scrape away any dirt, debris or other contamination 53 to provide a good clean sealing surface for engagement by the compressible member 24.

Preferably a chamfered relief area 52 is provided at the end 46 of the cylindrical member 12 which permits the disk 40 to be pressed into this relief area so as to reduce its effective diameter to allow the disk to be readily inserted in the tube 13.

Prior to installing the plug 10 in the tube 13, the bolt 18 is threaded into the bore 16 of the cylindrical member 12 sufficiently to lightly clamp the expandable sleeve 24 between the member 12 and the rigid disk 32 without causing radially outwardly expansion of the expandable sleeve. When the plug 10 is inserted into the tube 13, with the abrasive disk 40 leading the way, the abrasive disk cleans off the inside 51 of the tube allowing a clean surface area for engagement by the expandable sleeve 24. The disk 40 is sufficiently large in diameter so that it provides a good frictional engagement with the tube 13 and, once the plug 10 is fully inserted into the tube, the disk will initially hold the plug 10 against rotation as the bolt 18 is further rotated to compress the compressible sleeve 24 and to cause it to expand radially inwardly against the bolt and outwardly against the tube inner surface 51. As the compressible sleeve 24 expands outwardly, it also engages the tube wall 51 with sufficient force so as to provide further resistance against rotation and to allow greater compression and thus radial expansion of the sleeve 24.

In this method and with this arrangement, no separate cleaning step or cleaning tool is required, nor is an eccentrically mounted disk required to hold the plug 10 against rotation while the bolt 18 is providing the compression of the sleeve 24.

FIG. 1 illustrates the plug 10 inserted into the tube 13 and shows the abrasive disk 40 in engagement with the inner surface 51 of the tube 13 and being deflected into the chamfered relief area 52. FIG. 1 also illustrates the bolt 18 as having been significantly engaged into the cylindrical member 12 so as to provide some compression to the compressible sleeve 24 such that it is in full engagement with the inner surface 51 of the tube 13 and also in engagement with the shank 20 of the bolt 18. The bolt 18 is provided with a head 54 having a tool engaging recess 56 which receives a driving tool 58 such as a one quarter inch or three eighths inch square drive, an allen wrench or a Torx® driver. When removal of the plug 10 is desired, the bolt 18 is loosened and the head 54 is grasped with an appropriate tool and the entire plug assembly is easily withdrawn from the tube 13.

Figure 2:
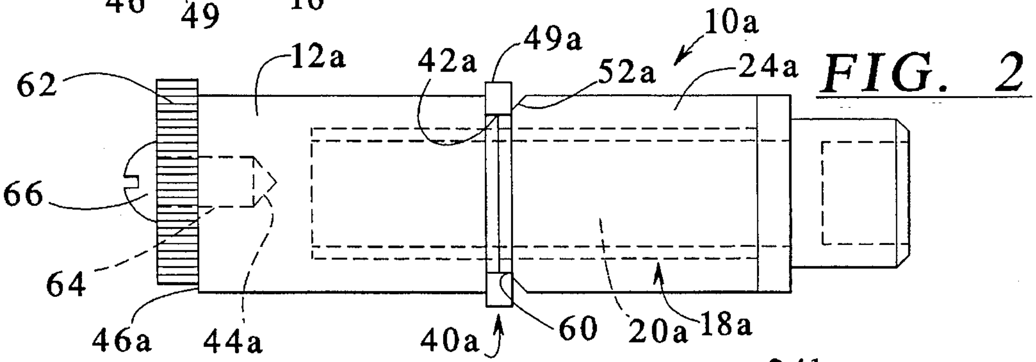
FIG. 2 is a side elevational view of a second embodiment of the present invention in isolation.

FIG. 2 illustrates a second embodiment of a tube plug 10*a* which differs from the first embodiment in the placement of the cleaning device. In this embodiment many of the components are the same, however the placement is slightly different. For example, there is a cylindrical member 12*a*, a compressible sleeve 24*a*, a bolt 18*a* and a cleaning disk 40*a*. The cylindrical member 12*a* differs in that a leading edge 46*a* does not include the chamfered recess area of the embodiment of FIG. 1, rather chamfered recess area 52*a* is provided at a leading edge 60 of the compressible member 24*a*. The cleaning disk 40*a* is positioned between the cylindrical member 12*a* and the compressible member 24*a* and has a greatly enlarged inner bore 42*a* to receive the shank 20*a* of the bolt 18*a*.

A cylindrical disk 62 is positioned at the leading edge 46*a* of the cylindrical member and a blind bore 44*a* is provided in the leading edge 46*a*, offset from the central axis of the cylindrical member 12*a*. The disk 62 has a clearance bore 64 therethrough, also positioned off center to the same extent that the blind bore 44*a* is and the disk 62 is rotatingly held at the leading end 44*a* by means of a screw 66. Thus, the disk 62 is free to rotate relative to the cylindrical member 12*a* in an eccentric manner which will allow the disk 62 to engage the inner wall 51 of the tube 13 so as to wedge the disk 62 and the cylindrical member 12*a* against the inner wall to prevent the plug 10*a* from rotating as the bolt 18 is rotated to compress the compressible member 24*a*. Again, the cleaning disk 40*a* has a diameter greater than that of the cylindrical member 12*a* such that it will engage against the inner surface 51 of the tube 13 to provide the desired cleaning action. The eccentrically mounted disk 62 is provided in the event that the cleaning disk 40*a* is unable to provide sufficient friction against the inner surface 51 so as to prevent rotation of the plug 10*a* within the tube 13.

Figure 3:
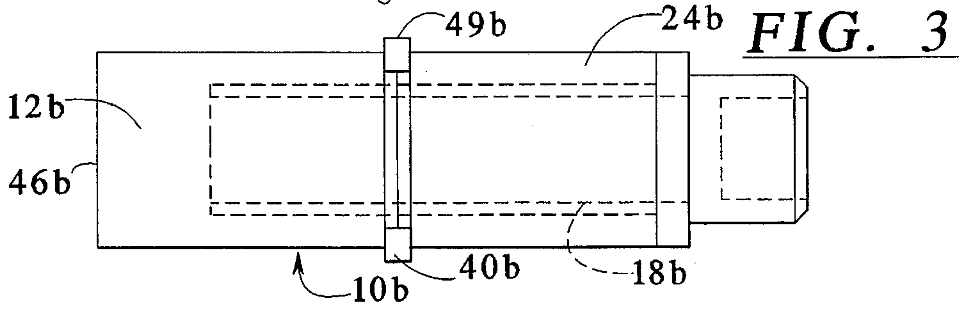
FIG. 3 is a side elevational view of a third embodiment of the present invention in isolation.

FIG. 3 illustrates a third embodiment of the tube plug 10*b* of the present invention which differs from the second embodiment in that the eccentrically mounted disk 62 is not utilized and thus, a leading end 46*b* of the cylindrical member 12*b* is without any bore. In all other respects, the tube and its components and operation is identical to that of FIG. 2, except that the cleaning disk 40*b* in this arrangement does have sufficient frictional engagement with the inner surface 51 of the tube 13 so as to avoid the necessity of the use of the eccentric disk to prevent rotation of the plug 10*b* while the bolt 18*b* is being rotated to compress the compressible member 24*b*.

Figure 4:
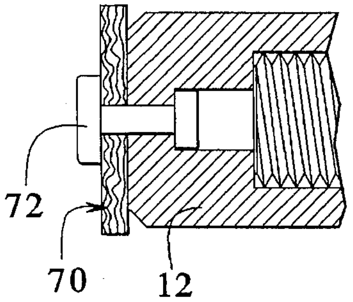
FIG. 4 is a partial side sectional view of an alternate cleaning element in the form of a brush attached by means of a rivet.

FIG. 4 illustrates an alternate embodiment of the cleaning device, and in this embodiment there is illustrated a wire brush or wheel 70 which is secured to the cylindrical member 12 by means of a rivet 72. The brush or wheel preferably has stainless steel, bronze or nylon bristles which will engage against the inner surface 51 of the tube. Again, the diameter of this cleaning device is in excess of the diameter of the cylindrical member so as to assure good engagement and friction with the surface 51.

Figure 5:
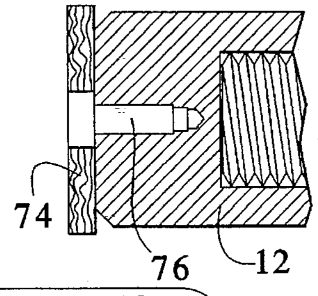
FIG. 5 is a partial side sectional view of an alternate cleaning element in the form of a brush wheel carried on a stem press fit into the cylindrical member.
Figure 6:
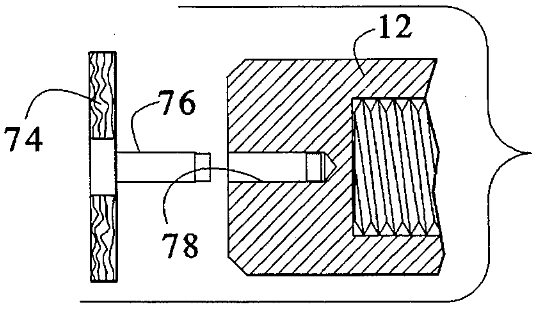
FIG. 6 is a partial side sectional view of the cleaning element of FIG. 5 prior to its insertion into the cylindrical member.

FIGS. 5 and 6 show yet another embodiment of the cleaning member which is in the form of a brush or wheel 74 which has an integral central stem 76. The cylindrical member 12 is provided with a blind bore 78 sized to receive the stem 76 in a press fit manner so that the stem will be held against rotation. Once this brush 74 is secured to the cylindrical member 12, its operation will be identical to that shown in the embodiment of FIG. 4 and FIG. 1.

It should also be noted that a brush or wheel can be used in the position for the cleaning device as shown in FIGS. 2 and 3 so long as a sufficiently large central opening is provided to allow for clearance by the bolt 18. Of course, in such an arrangement, the embodiment of FIG. 5 having an integral stem 76, would not be utilized.

Thus, it is seen that with the use of the presently disclosed device, the method of plugging a tube is simplified in that it involves only the step of inserting the plug carrying the cleaning device into the open end of the tube, with the cleaning device cleaning the way for the engagement of the tube wall by the compressible member 24, and then tightening of the bolt 18. The previous method required a separate step of inserting and typically rotating and removing a separate cleaning device, prior to insertion of the tube plug, which is now avoided.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A self cleaning plug positionable within a tube having an internal surface with a defined dimension, said plug comprising:

a rigid member having a threaded bore and an external dimension less than said defined dimension, a compressible member, a bolt extending axially through said compressible member and into said threaded bore of said rigid member, means associated with said bolt allowing for engagement with a first end of said compressible member, such that rotation of said bolt into said rigid member will result in axial compression and radial expansion of said compressible member, and a single cleaning and anti-rotation device in the form of a flexible abrasive disk secured against rotation relative to said rigid member, centered relative to the rigid member and having an external dimension greater than that of said rigid member and greater than said defined dimension to provide significant frictional engagement with the internal surface of the tube without the use of an eccentrically mounted rotation retarding device.

2. A self cleaning plug according to claim 1, wherein said cleaning device is secured to one end of said rigid member and said compressible member engages an opposite end of said rigid member.

3. A self cleaning plug according to claim 2, wherein said one end of said rigid member has a chamfered clearance at an outer periphery thereof to receive a portion of said cleaning device upon insertion of said plug into said tube.

4. A self cleaning plug according to claim 1, wherein said cleaning device is secured between said rigid member and said compressible member.

5. A self cleaning plug according to claim 4, wherein said compressible member has a chamfered clearance at an outer periphery thereof to receive a portion of said cleaning device upon insertion of said plug into said tube.

6. A self cleaning plug according to claim 1, wherein said rigid member has the shape of a circular cylinder.

7. A self cleaning plug according to claim 1, wherein said compressible member has the shape of a circular cylinder.

8. A self cleaning plug according to claim 1, wherein said means associated with said bolt comprises a head on said bolt and a second rigid member, said second rigid member being positioned between said bolt head and said compressible member.

9. A self cleaning plug comprising:

a rigid cylindrical member having a threaded bore and a predefined external diameter, a compressible cylindrical member having a through bore at least as large as said threaded bore, a bolt extending axially through said compressible member through bore and into said threaded bore of said rigid member, said bolt having a head, a second rigid member positioned between said bolt head and said compressible member, such that rotation of said bolt into said rigid cylindrical member will result in axial compression and radial expansion of said compressible member, and a single cleaning and anti-rotation device in the form of an abrasive disk secured against rotation relative to said rigid member, centered relative to the rigid member positioned adjacent to at least one of said rigid cylindrical member and said compressible member and having an external diameter greater than said predefined external diameter.

10. A self cleaning plug according to claim 9, wherein said cleaning device is secured to one end of said rigid cylindrical member and said compressible member engages an opposite end of said rigid cylindrical member.

11. A self cleaning plug according to claim 9, wherein said cleaning device is secured between said rigid cylindrical member and said compressible member.

12. A self cleaning plug comprising:

a rigid circular cylindrical member having a threaded bore and a predefined external diameter, a compressible circular cylindrical member having a through bore with a diameter at least as large as a diameter of said threaded bore and an external diameter substantially equal to said predefined external diameter, a bolt extending axially through said compressible member through bore and into said threaded bore of said rigid member, said bolt having a head, a second rigid member positioned between said bolt head and said compressible member, such that rotation of said bolt into said rigid circular cylindrical member will result in axial compression and radial expansion of said compressible member, and a single circular flexible abrasive cleaning and anti-rotation disk secured against rotation relative to said rigid member, centered relative to said rigid member, positioned adjacent to at least one of said rigid cylindrical member and said compressible member and having an external diameter greater than said predefined external diameter.

13. A self cleaning plug according to claim 12, wherein said cleaning disk is secured to one end of said rigid circular cylindrical member and said compressible member engages an opposite end of said rigid member.

14. A self cleaning plug according to claim 12, wherein said cleaning disk is secured between said rigid circular cylindrical member and said compressible member.

* * * * *